US008437892B1

(12) United States Patent
Hope et al.

(10) Patent No.: US 8,437,892 B1
(45) Date of Patent: May 7, 2013

(54) METHOD AND SYSTEM FOR ESTABLISHMENT AND MAINTENANCE OF A GLOBAL FORMATION OF DIRECTIONALLY-FIXED SPACECRAFT WITHOUT THE USE OF EXPENDABLE MASS

(75) Inventors: Alan Scott Hope, Alexandria, VA (US); Annie Megan Lum, Austin, TX (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 338 days.

(21) Appl. No.: 13/010,202

(22) Filed: Jan. 20, 2011

Related U.S. Application Data

(60) Provisional application No. 61/296,570, filed on Jan. 20, 2010.

(51) Int. Cl.
*B64G 1/36* (2006.01)

(52) U.S. Cl.
USPC ........................................ 701/13; 244/158.1

(58) Field of Classification Search ................... 701/13, 701/531; 244/158.1
See application file for complete search history.

(56) References Cited

U.S. PATENT DOCUMENTS

| | | | | |
|---|---|---|---|---|
| 4,591,116 | A * | 5/1986 | Guenther et al. | 244/168 |
| 5,697,050 | A * | 12/1997 | Wiedeman | 455/12.1 |
| 5,758,260 | A * | 5/1998 | Wiedeman | 455/12.1 |
| 5,806,801 | A * | 9/1998 | Steffy et al. | 244/158.6 |
| 6,198,990 | B1 * | 3/2001 | Croom et al. | 701/13 |
| 6,340,138 | B1 * | 1/2002 | Barsky et al. | 244/165 |
| 6,341,249 | B1 * | 1/2002 | Xing et al. | 701/13 |
| 6,553,286 | B2 * | 4/2003 | Turner et al. | 701/13 |
| 7,806,369 | B2 * | 10/2010 | Kawaguchi | 244/158.4 |
| 2002/0136191 | A1 * | 9/2002 | Draim et al. | 370/344 |
| 2006/0276128 | A1 * | 12/2006 | Castiel et al. | 455/12.1 |
| 2008/0029650 | A1 * | 2/2008 | Kawaguchi | 244/158.4 |
| 2012/0286098 | A1 * | 11/2012 | Poulos | 244/158.1 |

OTHER PUBLICATIONS

Leonard, C. L., Hollister, W. M. and Bergmann, E. V., "Orbital Formationkeeping with Differential Drag", J Guidance, vol. 12 No. 1 p. 108-113 Feb. 1989.

Bevilacqua, R. and Romano, M., "Rendezvous Maneuvers of Multiple Spacecraft Using Differential Drag Under J2 Perturbation", Journal of Guidance, Control, and Dynamic, vol. 31, No. 6, Nov.-Dec. 2008.

Dumar, B. S., and NG, A., "A Bang-Bang Control Approach to Maneuver Spacecraft in a Formation with Differential Drag", American Institute of Aeronautics and Astronatics, Aug. 18-21, 2008.

* cited by examiner

*Primary Examiner* — Helal A Algahaim
(74) *Attorney, Agent, or Firm* — Amy L. Ressing; Suresh Koshy

(57) ABSTRACT

A method of establishing a formation of a plurality of directionally fixed satellites, such as primary formation of the satellites with in-track velocity disparity. The plurality of satellites includes an anchor satellite and at least one non-anchor satellite, each satellite of the plurality of satellites including at least one drag flap, each satellite of the plurality of satellites being free of one of a propulsion system and an expendable mass propellant. Control is applied to deploy the at least one drag flap of the at least one non-anchor satellite based on the current spacing and the current separation rate of the each non-anchor satellite, and the predicted final spacing of the plurality of satellites. The final spacing predicting and the drag flap control applying is repeated until the current separation rate has been nulled to within a threshold value.

5 Claims, 8 Drawing Sheets

METHOD AND SYSTEM FOR ESTABLISHMENT AND MAINTENANCE OF A GLOBAL FORMATION OF DIRECTIONALLY-FIXED SPACECRAFT WITHOUT THE USE OF EXPENDABLE MASS

CROSS-REFERENCE TO RELATED APPLICATIONS

This application claims the benefit under 35 U.S.C. Section 119(e) of the following co-pending and commonly-assigned U.S. patent application: U.S. Provisional Application Ser. No. 61/296,570, filed on 20 Jan. 2010, by Alan Scott Hope and Annie Megan Lum, entitled "METHOD AND SYSTEM FOR ESTABLISHMENT AND MAINTENANCE OF A GLOBAL FORMATION OF DIRECTIONALLY-FIXED SPACECRAFT WITHOUT THE USER OF EXPENDABLE MASS," which application is incorporated by reference herein.

BACKGROUND OF THE INVENTION

Formations of satellites in co-planar orbits around a single body are increasingly being used to perform functions that a single spacecraft would be unable to do. To optimize the formation, the inter-satellite spacing should be maintained over the lifetime of the vehicles. This requires the satellites to achieve the desired inter-satellite separation after launch, to compensate for any perturbing forces they encounter while in orbit and to redistribute the formation if one or more satellites experience a systemic failure. In the past, formation assembly and maintenance have been performed using expendable-mass propulsion systems. However, many spacecraft, particularly micro- and nano-satellites, have extreme space and mass constraints which make it difficult to incorporate a propulsion system that depends on expendable mass. Expendable-mass propulsion systems also increase the cost and complexity of the spacecraft. It is therefore desirable and cost effective to use naturally occurring forces to perform formation establishment and maintenance.

Atmospheric drag is typically a dominant perturbing force for spacecraft in Low Earth Orbit ("LEO"). Differential atmospheric drag can arise due to variations in atmospheric density, variations in temperature, differences in satellite mass profiles, and variations in spacecraft drag coefficients, among others. The acceleration due to atmospheric drag is given by the following equation:

$$a = \frac{1}{2M}\rho V^2 A C_D \quad (1)$$

M is the spacecraft mass, p is the atmospheric density, V is the velocity, A is the cross-sectional area in the direction of motion. $C_D$ is the drag coefficient, and acceleration acts in the negative velocity direction. While the mass and drag coefficient of the spacecraft cannot be easily changed during flight, the cross-sectional area may be varied with minimal effort.

Several studies have advocated the use of differential drag to maintain spacing between multiple satellites or to perform rendezvous maneuvers between multiple spacecraft. In these studies, several approaches to the problem of altering the cross-sectional area have been proposed. C. L. Leonard suggested varying the angle of attack of a plate on the spacecraft in order to vary the cross-sectional area. See, e.g., C. L. Leonard, "Formation keeping of Spacecraft via Differential Drag, M. S. Thesis, Massachusetts Institute of Technology, July 1986, incorporated herein by reference. Additional solutions include drag plates which can be opened or closed, solar panel orientation, and orienting the spacecraft to achieve the desired cross-sectional area. See, e.g., U.S. Pat. No. 5,806,801; Balaji Shankar Kumar, Alfred Ng, Keisuke Yoshihara and Anion De Ruiter. "Differential Drag as a means of Spacecraft Formation Control." Proceedings of the IEEE Aerospace Conference, Big Sky, Mont., March 2007: Balaji Shankar Kumar and Alfred Ng, "A Bang-Bang Control Approach to Maneuver Spacecraft in a Formation With Differential Drag," AIAA Guidance, Navigation and Control Conference and Exhibit, Aug. 18-21, 2008, Honolulu, Hi., AIAA 2008-6469; Balaji Shankar Kumar, Alfred Ng, and Keisuke Yoshihara "Flight Dynamics and Control of the JC2Sat Mission," Advances in the Astronautical Sciences, Vol 129, Pert 3, 2008 (AAS 07-410); Riccardo Bevilacqua and Marcello Romano, "Rendezvous Maneuvers of Multiple Spacecraft Using Differential Drag Under 12 Perturbation," Journal of Guidance. Control and Dynamics, Vol. 3 1. No. 6, November-December 2008; Timothy Maclay and Christopher Tuttle, "Satellite Station keeping of the ORBCOMM Constellation Via Active Control of Atmospheric Drag: Operations, Constraints, and Performance," Advances in the Astronautical Sciences, Vol. 120, Part I, pp. 763-773, all incorporated by reference.

The use of differential drag for formation maintenance has been successfully demonstrated by OrbComm Inc. OrbComm satellites rely on solar panel orientation to increase the cross-sectional area in the desired direction (i.e., either the direction of motion, or the direction of solar radiation pressure) while the satellite is in eclipse or has excess power while in sunlight. At other times, the attitude of the spacecraft is adjusted to increase or decrease the projected area in a desired direction. Attitude control is an effective method for increasing the cross-sectional area only when the spacecraft uses symmetric antenna patterns. U.S. Pat. No. 5,806,801, which discusses the method and system employed by the OrbComm satellites, discloses that the radiation patterns used by antenna subsystems are substantially symmetrical such that radio transmissions are not adversely affected by a yaw angle induced to increase the cross-sectional area in the desired direction. Satellites with asymmetric antenna patterns must remain directionally-fixed in the Local Vertical. Local Horizontal ("LVLH") system and as such cannot use attitude control as a means to increase cross-sectional area.

In previous studies, the focus has been on small-scale maneuvers such as formation maintenance and/or satellite maneuvering in close proximity. In the case of the OrbComm constellation, formation assembly is mentioned, but it is specified that propellant-fueled thrusters will be used to help move the spacecraft closer to the desired final trajectory before differential drag is employed to make smaller adjustments to the orbit profile. Mathews and Leszkiewicz developed methods to control relative decay between two satellites and therefore minimize fuel required for formation keeping. See, e.g., Michael Mathews and Susan Leszkiewicz, "Efficient Spacecraft Formationkeeping With Consideration of Ballistic Coefficient Control," AIAA 26th Aerospace Sciences Meeting, AA-88-0375, January 1988, incorporated herein by reference. C. I. Leonard developed control laws to maintain close-proximity spacing between two vehicles. Kumar et al similarly developed a control method to maintain spacing between two satellites and to perform maneuvers to vary the separation distance between 20 km and 100 m. In these three cases, the control methods were developed using the Hill-Clohessy-Wiltshire (HCW) equations. The maneuvers proposed by Bevilacqua and Ramano are, by definition, close-proximity maneuvers and are based on HCW equations that have been modified to include the J2 effect. The J2 effect relates to a gravitational perturbations model that partially accounts for the Earth not being perfectly spherical. See, e.g., Riccardo Bevilacqua and Marcello Romano, "Rendezvous Maneuvers of Multiple Spacecraft Using Differential Drag Under 12 Perturbation," Journal of Guidance, Control and Dynamics, Vol. 3 1, No. 6, November-December 2008, incorporated herein by reference.

BRIEF SUMMARY OF THE INVENTION

Applicants recognized a need for a method and system for the establishment and maintenance of a global formation of directionally-fixed satellites without the use of expendable mass or propellant-fueled thrusters. The current invention meets this need though the use of standard drag flaps that can increase the cross-sectional area of the satellite in the direction of motion. The use of drag flaps allows the satellites to maintain a single orientation throughout the mission, which allows for the use of asymmetric antenna patterns. The control methods according to an embodiment of the invention need not rely on linearized equations of motion and will therefore be usable for large separation distances and non-circular orbits. Methods according to an embodiment of the invention allow formation establishment and formation maintenance using only the drag flaps for spacecraft propulsion.

An embodiment of the invention includes a method of establishing a primary formation of a plurality of directionally fixed satellites, such as primary formation of the satellites with in-track velocity disparity. The plurality of satellites comprises an anchor satellite and at least one non-anchor satellite, each satellite of the plurality of satellites comprising at least one drag flap, each satellite of the plurality of satellites being free of one of a propulsion system and an expendable mass propellant. A position and velocity of each satellite of the plurality of satellites is determined after deployment thereof from a launch vehicle. A satellite of the plurality of satellites having a highest mean velocity is designated as the anchor satellite. A current spacing and a current separation rate of each non-anchor satellite with respect to the anchor satellite is determined based on the determined position and velocity of the each satellite. A final spacing of the plurality of satellites is predicted based on the current spacing and the current separation rate of the each non-anchor satellite, solar and lunar perturbing gravitational conditions, earth gravitational conditions, solar radiation pressure, and an atmospheric density model. Control is applied to deploy the at least one drag flap of the at least one non-anchor satellite based on the current spacing and the current separation rate of the each non-anchor satellite, and the predicted final spacing of the plurality of satellites. The final spacing predicting and the drag flap control applying is repeated until the current separation rate has been nulled to within a threshold value.

Optionally, the at least one drag flap of the at least one non-anchor satellite is stowed when the current separation rate has been nulled to within the threshold value.

Optionally, the repeating the final spacing predicting and the drag flap control applying until the current separation rate has been nulled to within the threshold value is performed after the current separation rate has been reduced by a predetermined percentage relative to its value at a time of drag flap deployment.

Optionally, the at least one drag flap of the at least one non-anchor satellite is stowed before the current separation rate has been nulled to within the threshold value.

Another embodiment of the invention includes a method of establishing a secondary formation of a plurality of directionally fixed satellites. Examples of such formations include 1) a secondary formation after a primary formation was formed at some earlier point in time, and 2) a primary formation, if there were little or no in-track velocity disparity between the satellites. The plurality of satellites comprises an anchor satellite and at least one non-anchor satellite, each satellite of the plurality of satellites comprising at least one drag flap, each satellite of the plurality of satellites being free of one of a propulsion system and an expendable mass propellant. A position and velocity of each satellite of the plurality of satellites are determined after deployment thereof from a launch vehicle. A satellite of the plurality of satellites having a lowest mean velocity is designated as the anchor satellite. First control is applied to deploy the at least one drag flap of the at least one non-anchor satellite to induce an induced velocity for each non-anchor satellite with respect to the anchor satellite. A current spacing and a current separation rate of each non-anchor satellite with respect to the anchor satellite are determined based on the determined position and induced velocity of the each satellite. A final spacing of the plurality of satellites is predicted based on the current spacing and the current separation rate of the each non-anchor satellite, solar and lunar perturbing gravitational conditions, earth gravitational conditions, solar radiation pressure, and an atmospheric density model. Second control is applied to stow the at least one drag flap of the at least one non-anchor satellite and to deploy the at least one drag flap of the anchor satellite based on the current spacing and the current separation rate of the each non-anchor satellite, and the predicted final spacing of the plurality of satellites. The final spacing predicting and the second drag flap control applying are repeated until the current separation rate has been nulled to within a threshold value.

Optionally, a configuration of the at least one drag flap of the at least one non-anchor satellite is matched to a configuration of the at least one drag flap of the anchor satellite when the current separation rate has been nulled to within the threshold value.

Optionally, the repeating the final spacing predicting and the drag flap control applying until the current separation rate has been nulled to within the threshold value is performed after the current separation rate has been reduced by a predetermined percentage relative to its value at a time of drag flap deployment.

At least one embodiment of the invention includes one or more of the following features and/or advantages. First, control algorithms presented herein complete the establishment of a global scale formation of spacecraft without the use of propellant-fueled thrusters or expendable mass. Applicants are unaware of any other previous studies have proposed a method and system for global formation establishment using purely differential drag. An embodiment of this invention allows satellites with size, mass and/or budget restrictions to achieve formation by harnessing naturally occurring forces, instead of using a conventional thruster system.

Second, the use of drag flaps instead of attitude control allows all spacecraft in the global formation to remain directionally fixed throughout the duration of the mission. U.S. Pat. No. 5,806,801, incorporated herein by reference, disclosed the use of attitude control to increase the cross-sectional area while the spacecraft is in sunlight. However, this approach is not reasonable for spacecraft that use asymmetric antenna patterns or must for other reasons remain directionally fixed.

Bevilacqua and Romano proposed using a drag plate that may be opened or closed in order to vary the cross-sectional area. Bevilacqua and Romano disclose a drag plate that pivots around an axis such that it is either edge-on or face-on to the direction of motion. But, their application deals only with close proximity maneuvering and not with large-scale formation establishment and maintenance. By way of contrast, the control laws discussed in at least one embodiment of the instant invention does not rely on the HCW equations (such as used by Bevilacqua and Romano) and make no assumptions of linearity due to small inter-satellite separations and near-zero eccentricity (such as made by Bevilacqua and Romano). Additionally, the control methods presented here are not dependent on simplified analytical expressions of the Earth's gravitational field (again, (such as used by Bevilacqua and Romano). As such, these control laws are applicable at large separation distances and non-circular orbits.

Third, at least one embodiment of the invention allows establishment of a secondary formation, e.g., formation redistribution in the event of a spacecraft failure. Because the desired formations are global, spacecraft will need to perform large-scale maneuvers after a failure in order to re-optimize the formation. Having control methods to deal with spacecraft failure increases the system's durability by ensuring that mission objectives can be completed with an optimal formation, regardless of potential accidents, mechanical failures, malfunctions, etc. As noted earlier, the control law for redistribution can also be used for formation establishment in the event that spacecraft separate from the launch vehicle with minimal variance in in-track velocity. It can additionally be used for large-scale maneuvering in general, such as dispersal of a clustered formation into a global formation or vice versa.

Fourth, the control laws discussed herein according to at least one embodiment of the invention make no assumptions of linearity due to small inter-satellite separations and near-zero eccentricity and further make no simplifying assumptions to model the Earth's gravitational field. Therefore, these control methods can apply to a wider variety of potential missions, one example being missions requiring non-circular orbits. The control laws discussed in this document could apply to elliptical orbits, provided that certain unique challenges are considered. Over the course of an orbit, the angular spacing between any two vehicles will fluctuate because velocity is not constant in elliptical orbits. Additionally, the anchor as defined in this document would vary over an orbit period depending on which satellite was closest to periapse. For non-circular orbits, the definition of the desired separation angle between satellites and the definition of the anchor spacecraft would fall to the user.

With the use of the formation establishment, formation maintenance and redistribution methods presented herein, a global constellation of spacecraft can be launched, assembled, and kept in place without the use of expendable mass. Advantageously, this will save space, mass, and costs associated with expendable-mass propulsion systems.

DETAILED DESCRIPTION OF THE INVENTION

Figure 1:
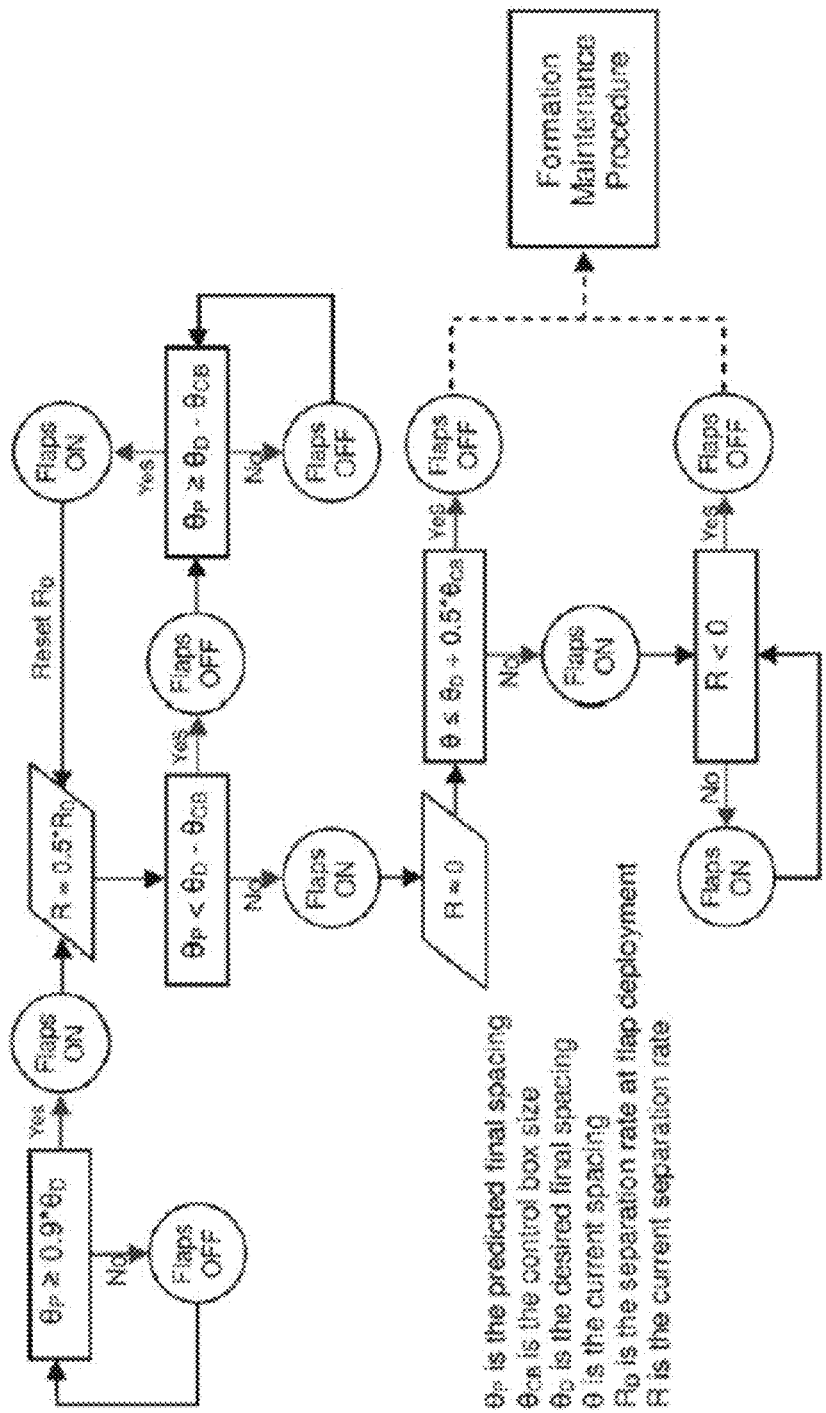
FIG. 1 is a flow diagram of the control law according to an embodiment of the instant invention for constellation formation establishment for non-anchor spacecraft.

Embodiments of the present invention include a method and/or system for formation establishment and formation maintenance between two or more standard directionally-fixed spacecraft in a coplanar orbit without the use of expendable mass. Each spacecraft in a constellation of spacecraft according to the invention is directionally fixed in the Local Vertical Local Horizontal ("LVLH") system. For the purpose of this specification, it should be understood that the terms "directionally-fixed" and "attitude-stabilized" are not synonymous. "Directionally-fixed" is intended to mean that the spacecraft maintain the same orientation throughout the mission, thereby allowing for the use of asymmetrical antenna patterns, for example. By way of contrast, "attitude-stabilized" refers to the ability of a spacecraft to maintain a particular attitude with an attitude control system. An embodiment of the invention includes spacecraft having a symmetric antenna patterns, and another embodiment of the invention includes spacecraft having asymmetric antenna patterns. Formation establishment and maintenance will be accomplished solely by varying the cross-sectional area of the spacecraft in the direction of motion in order to induce differential drag. Examples of such directionally-fixed spacecraft include standard satellites and other orbiting space vehicles having an atmospheric density large enough to provide sufficient control through manipulation of the vehicles' drag. The change in cross sectional area is achieved through the use of standard deployable appendages known as drag flaps. Preferably, the drag flaps are foldable into the spacecraft's body when stowed, such that they add no surface area to the spacecraft's relative to the direction of motion. The actual position and velocity of each spacecraft in the formation is sensed or computed, and these are used to determine the separation distances and separation rates between spacecraft. Flaps are either deployed or stowed based on the separation distance and separation rate with respect to a particular spacecraft in a constellation of spacecraft. When the drag flaps are deployed, the area of the spacecraft in the direction of motion increases, thereby increasing the drag force and drag acceleration experienced by the spacecraft. This alters the relative position and velocity of the spacecraft within the formation.

Formation establishment begins after the satellites separate from a standard launch vehicle. If satellites separate with little or no relative in-track velocity, flaps are deployed to induce separation rates and cause satellites to move away from each other. Flaps are optionally also deployed to augment separation rates in the event that small, non-zero relative in track velocity components are imparted during separation from the launch vehicle. Increasing relative rates will decrease the time required to achieve the desired inter-satellite spacing. However, care should be taken to ensure that the relative velocity between any satellite pair does not exceed the predicted maximum velocity that could be nulled using the drag flaps. If the relative velocities imparted to the spacecraft are near this predicted maximum, flaps should only be deployed in order to null separation rates.

Given relative in-track velocities, the spacecraft begin to drift apart. Tracking data systems, on-board GPS, or other similar systems can provide estimates of the actual position and velocity of each spacecraft. The tracking data and/or the on-board GPS measurements are processed using a standard orbit propagation engine to determine a final estimate of the orbit for each spacecraft. From the tracking data and/or the on-board GPS measurements, the relative position (i.e., angular spacing) and relative velocity (i.e., separation rate) between spacecraft are deduced. That is, the final estimates of the orbit of each spacecraft are compared with each other to determine each spacecraft's relative position and relative velocity. In the present invention, all control is performed relative to a designated spacecraft. During primary formation establishment and nominal operations in formation maintenance, control is performed relative to the anchor spacecraft, defined as the spacecraft with the highest mean velocity. This is done because differential drag control can only be used to increase the velocity of a spacecraft. In the control laws presented here, flaps remain stowed on the anchor because it already has the highest velocity in the formation.

The desired spacing for each satellite is chosen based on its velocity relative to the anchor. For example, vehicles in an evenly distributed 6-satellite constellation would have desired spacing of 60, −120, 180, 240, and 300 degrees from the anchor. The satellite with the lowest velocity targets the desired spacing slot farthest from the anchor (i.e., 300 degrees). As the vehicle approaches the desired spacing, flaps are deployed to null the separation rate with respect to the anchor. The final angular spacing is predicted by adding the current angular spacing to the predicted angular drift that will occur during the flap deployment period as the separation rate is nulled. Flaps are deployed when the predicted final angular spacing with respect to the anchor is equal to, for example, 90% of the desired value. The illustrative 90% solution is used to help satellites avoid overshooting the desired spacing, which can occur particularly if the atmosphere behaves differently than predicted. If a satellite overshoots the desired spacing, it must become the anchor in order to complete formation establishment. It should be noted that the choice of 90% is merely a suggestion—the actual percentage is optionally varied according to mission requirements or preferences. The basic idea is to deploy flaps when the predicted final spacing is smaller than the desired value in order to avoid overshoot.

Once flaps are deployed, the system waits until the separation rate has been reduced to, for example, 50% of its value at the time of flap deployment, at which point the final predicted angular spacing with respect to the anchor is re-evaluated. Again, 50% is a suggested value and the actual percentage is optionally changed to reflect mission requirements or preferences. If the final predicted spacing is smaller than the desired value and is outside of the control box tolerance, flaps may be re-stowed in order to allow for further drift. Flaps will be deployed again once the final predicted spacing is within control box tolerances, at which point the separation rate at flap deployment is reset to allow recursion.

Once the final predicted spacing is within control box tolerances, flaps remain deployed until the separation rate has been nulled to within a threshold value, hereafter referred to as $R_N$. At this point, if the position error of the satellite is less than or equal to the control box size, flaps are stowed, and the satellite moves into the nominal operations mode of formation maintenance. If the satellite has incurred overshoot (i.e., the position error is greater than the control box size), the satellite must take over the anchor position in order to move back into the desired slot. Flaps remain deployed until the satellite achieves the anchor position. Depending on the mission requirements, flaps can remain deployed after the satellite becomes the anchor in order to increase the rate at which the overshoot is reduced. The desired overshoot reduction rate may be a function of $R_N$, a function of the ratio between the maximum position error and the control box size, or a function of any parameter important to the particular mission application. The satellite remains in the anchor position until the overshoot has been reduced to an acceptable level. It is to be understood that if more than one satellite overshoots a desired spacing, the satellite with the largest overshoot becomes the new anchor. The other satellites in the constellation of satellites will be controlled relative to this new anchor. Because this new anchor is the satellite with the greatest overshoot, the remaining satellites will no longer be overshooting the desired spacing.

The angular drift during flap deployment is calculated based on the change in velocity that can be expected due to drag acceleration (Equation 1) over a particular time interval. The parameters included in this calculation are as follows: the atmospheric density predictions for the flap deployment period, the current velocity, spacecraft mass and drag coefficient and the difference in cross-sectional area that can be achieved through drag flap application. The flap deployment duration is allowed to vary as necessary to achieve a nulled separation rate. The drift angle prediction is updated as new velocity information becomes available. The full control law for formation establishment according to an embodiment of the invention is depicted in FIG. 1.

Testing of these control methods, for instance, requires the use of a standard orbit propagation engine, which includes (at least) a high fidelity model of the Earth's gravitational field, perturbing gravitational effects from the sun and moon, and effects from solar radiation pressure, as well as an atmospheric density (or drag) model. The following illustrative results are obtained using the orbit propagation engine from Analytical Graphics Inc.'s Satellite Tool Kit ("STK"). Additional tools that contain orbit propagation engines that include the effects listed above include, for example, GNSS-Inferred Positioning System and Orbit Analysis Simulation Software package (developed by NASA Jet Propulsion Laboratory), NASA's GEODYN Orbit Determination System, SOAP, NASA's Goddard Trajectory Determination System ("GTDS"), Lockheed Martin's Trajectory Analysis and Orbit Determination Program ("TRACE"), Naval Surface Weapons Center's CELEST computer program, and University of Texas-Austin's UTOPIA orbit determination software. The atmospheric drag model employed by the propagator is the Jacchia-Roberts density model with variable solar and geomagnetic activity values. See, e.g., Charles Roberts, "An Analytic Model for Upper Atmosphere Densities Based Upon Jacchia's 1970 Models," Celestial Mechanics, Vol. 4, Issue 2-3, pp. 368-377, incorporated herein by reference. Other standard atmospheric drag models include the Harris-Priester model, the Exponential Atmosphere Model, the Mass Spectrometer and Incoherent Scatter ("MSIS") model, and the Naval Research Laboratory Mass Spectrometer and Incoherent Scatter (NRL MSIS-00") Radar model. Satellites are modeled as cubes of $0.10\ m^2$ per side with additional area from flaps equal to $0.035\ m^2$. Satellites are assumed to be launched to a 550 km circular, polar orbit near solar maximum. All satellites receive a ΔV of 0.5±0.05 m/s at separation, a portion of which is in the in-track direction.

TABLE 1

Formation Establishment Scenario Results

| FORMATION ESTABLISHMENT SCENARIO | FORMATION ESTABLISHMENT DURATION (DAYS) | PREDICTED V. OBSERVED DENSITY | ADDITIONAL DRIFT PROBABILITY | OVERSHOOT PROBABILITY | NOTES |
|---|---|---|---|---|---|
| Nominal phasing | 234 | Predicted density has no average bias | Medium | Low | |
| Single separation failure | 232 | Predicted density has no average bias | Medium | Low | Active satellites separate to a 72 degree spacing |
| High density predicts | 278 | Predicted density is 25% higher than observed | Low | High | Anchor switches are required for initial phasing |
| Low density predicts | 268 | Predicted density is 25% lower than observed | High | Low | Satellites approach desired spacing from the lower bound of the control box |

Table 1 shows the formation establishment parameters for 4 scenarios. In the nominal, or primary formation establishment, scenario, six satellites successfully separate from the launch vehicle and density predictions closely match values used by the STK orbit propagator. In the nominal scenario, all satellites are assumed to be functional upon separation and the atmospheric density behaves as predicted.

Figure 2:
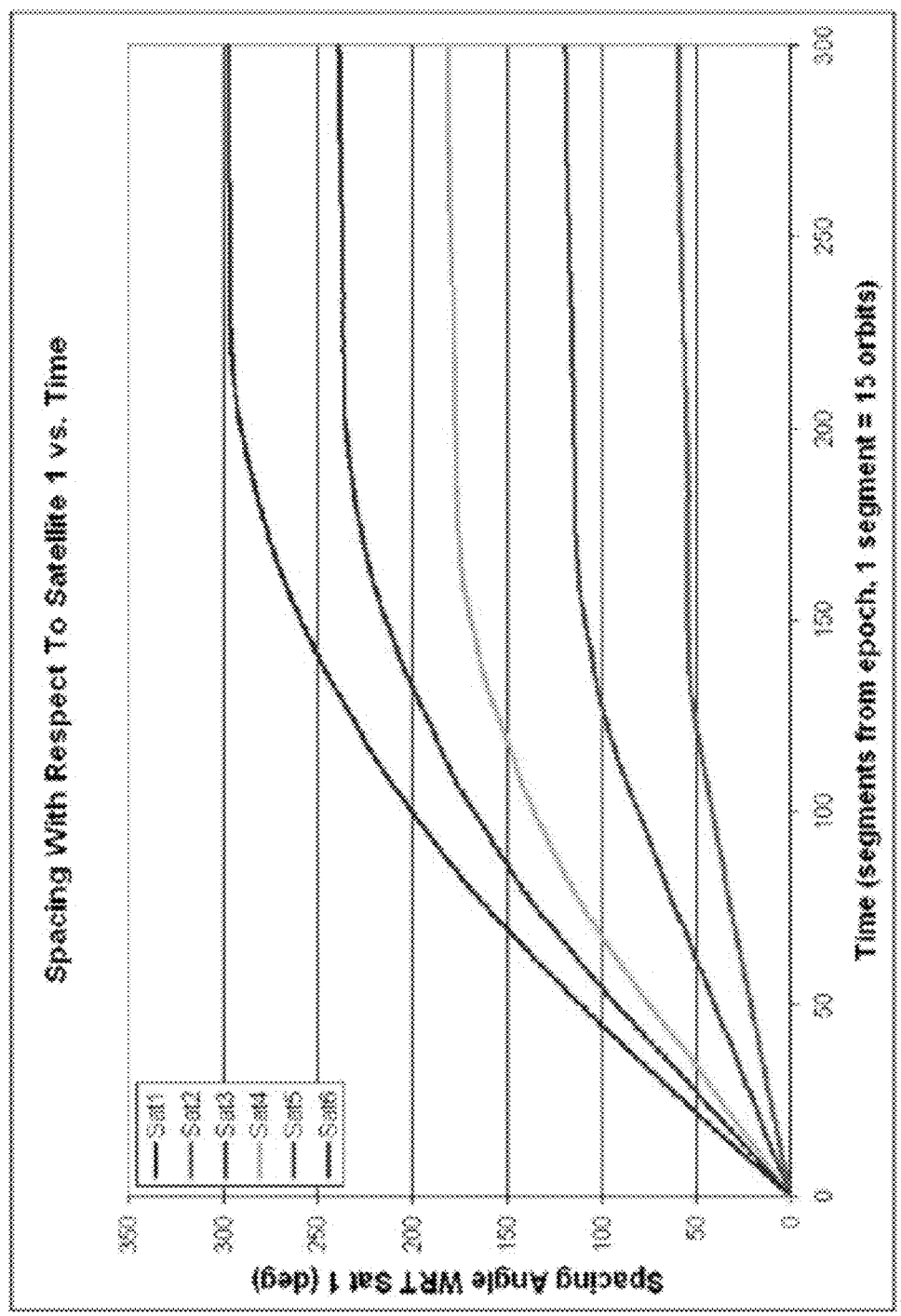
FIG. 2 is an illustrative graph of satellite spacing with respect to an anchor satellite during nominal or primary constellation formation establishment.
Figure 3:
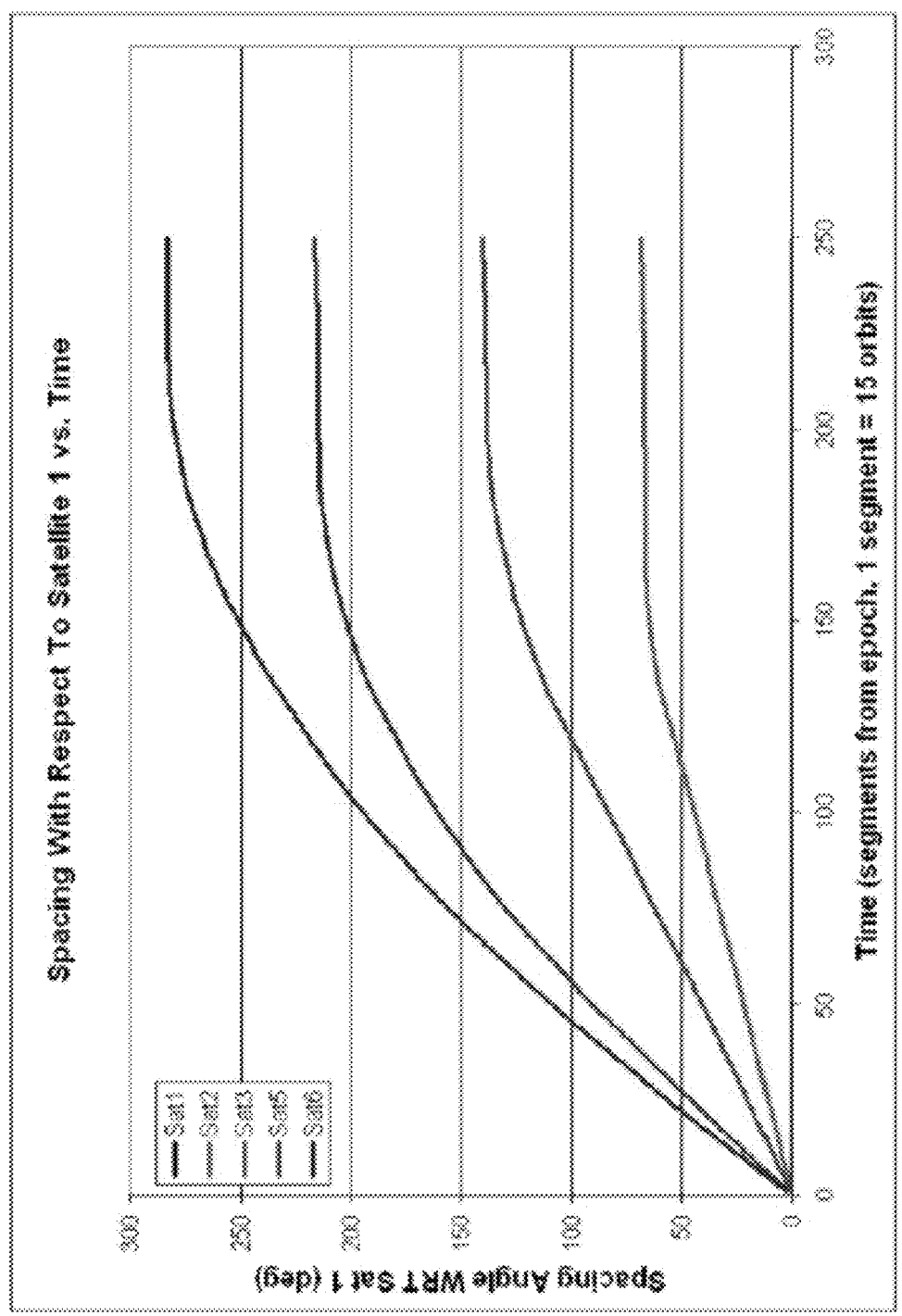
FIG. 3 is an illustrative graph of satellite spacing with respect to the anchor satellite during secondary formation establishment, such as after a single separation failure.
Figure 4:
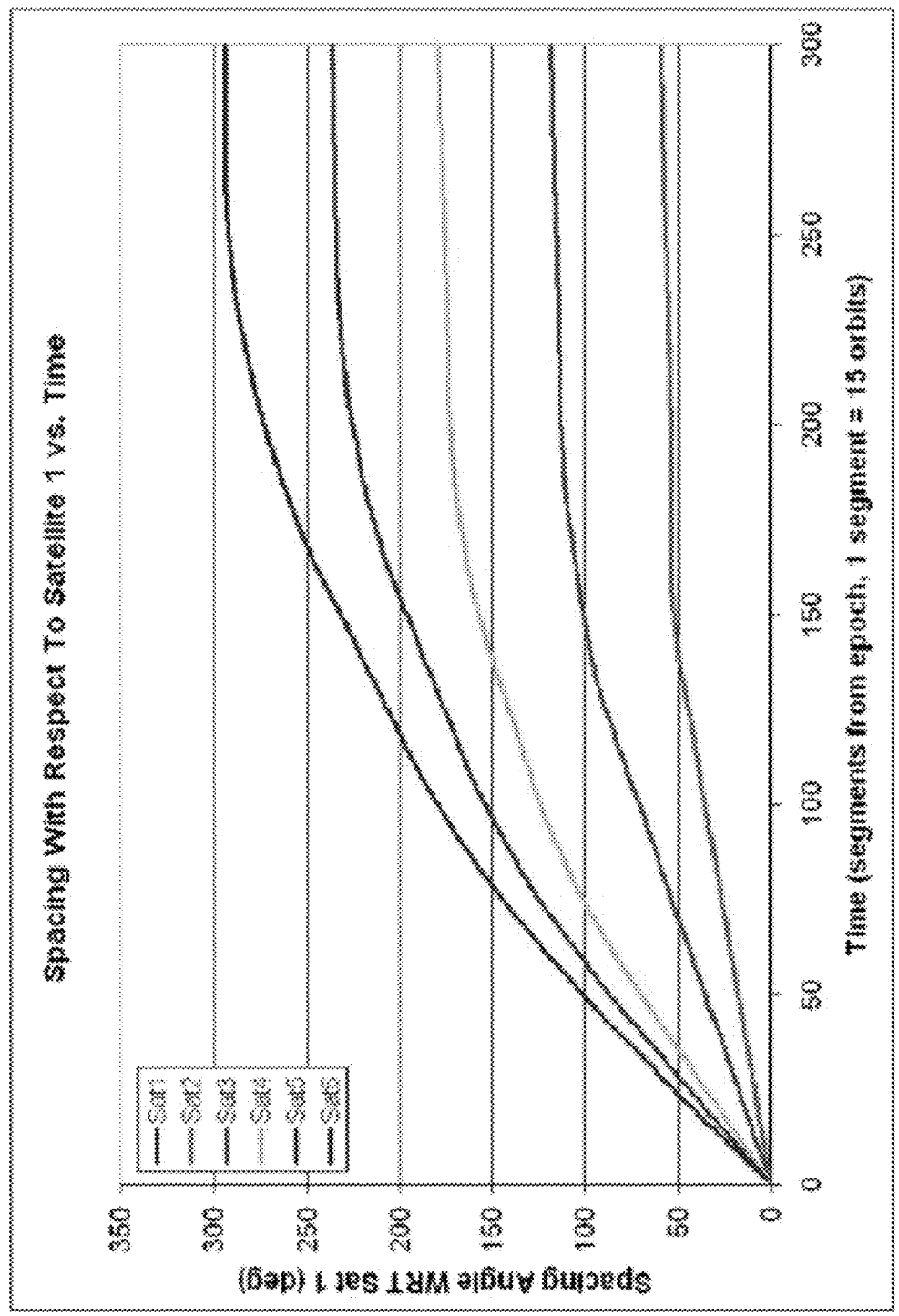
FIG. 4 is an illustrative graph of satellite spacing with respect to the anchor satellite during formation establishment using low density predictions.
Figure 5:
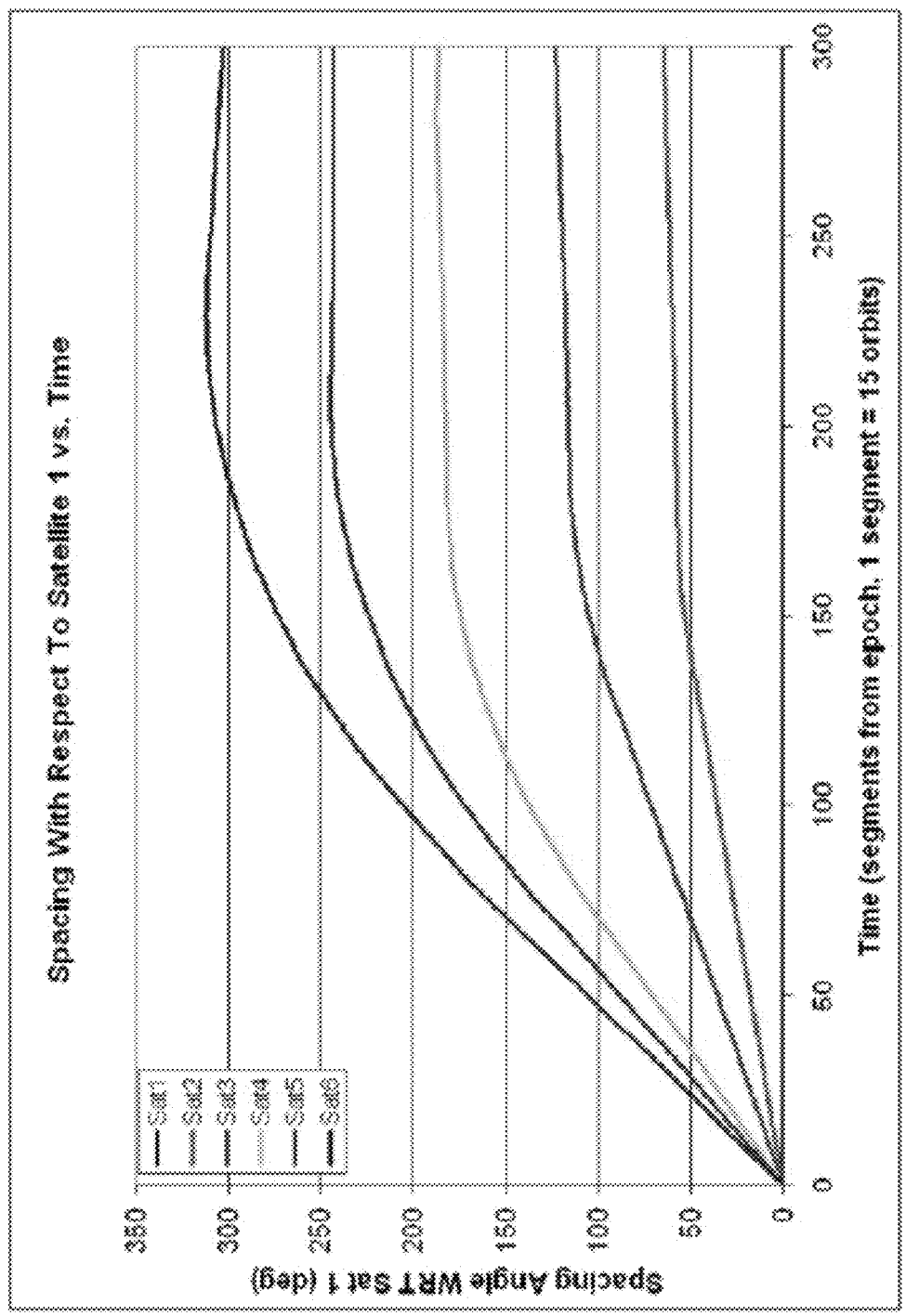
FIG. 5 is an illustrative graph of satellite spacing with respect to the anchor satellite during formation establishment using high density predictions.

FIG. 2 shows the spacing of the satellites in the nominal formation establishment scenario over time. FIGS. 3-5 show the other representative formation establishment scenarios. In these scenarios, Satellite 1 is the anchor and receives the largest negative in-track velocity component during separation from the launch vehicle. While these scenarios assume identical physical properties and perfect attitude control for all satellites, in reality small variances in parameters such as mass, drag coefficient and attitude error will impact the formation establishment. A disparity in drag coefficients or average attitude error can mimic a density prediction bias which can increase the time required to complete formation establishment and can introduce errors in the final spacing which would have to be corrected during formation maintenance.

FIGS. 4 and 5 represent scenarios in which the atmospheric density is imperfectly estimated. Results from these scenarios indicate that the formation establishment algorithm can effectively maneuver satellites into the desired location even with a 25% predicted density bias. Density predictions will likely be the most difficult aspect of formation establishment as it is difficult to accurately predict the behavior of the atmosphere on any given day. However, it is unlikely that the density predictions will be severely biased in a particular direction; rather, on any day there may be differences between predicted and observed values, but the time-averaged predicted density will more closely match the time-averaged observed density. Because the flaps are deployed over a span of weeks or months, it is the time-averaged density that becomes the important factor in predicting the final angular spacing. The scenarios represented in FIGS. 4 and 5 are meant to show an expected worst-case scenario of density predictions.

Maintenance of the formation includes two distinct modes. Under the nominal (or primary formation) mode of operations, differential drag is used to counteract perturbing forces that would tend to alter the desired inter-satellite separation. It is desired that the spacecraft remain within a designated control box in order to perform mission requirements. In the secondary formation mode, differential drag is used to redistribute the formation, such as in the event of a systemic failure of one or more satellites.

In the nominal operations mode, known as formation maintenance, control is triggered by a satellite's position error and separation rate with respect to the anchor. Position error is positive if the satellite is lagging behind its desired position with respect to the anchor. Assuming all satellites in the formation have identical mass profiles, drag coefficients, etc., satellites with positive position error will continue to lag farther and farther behind their desired locations unless flaps are deployed.

Figure 6:
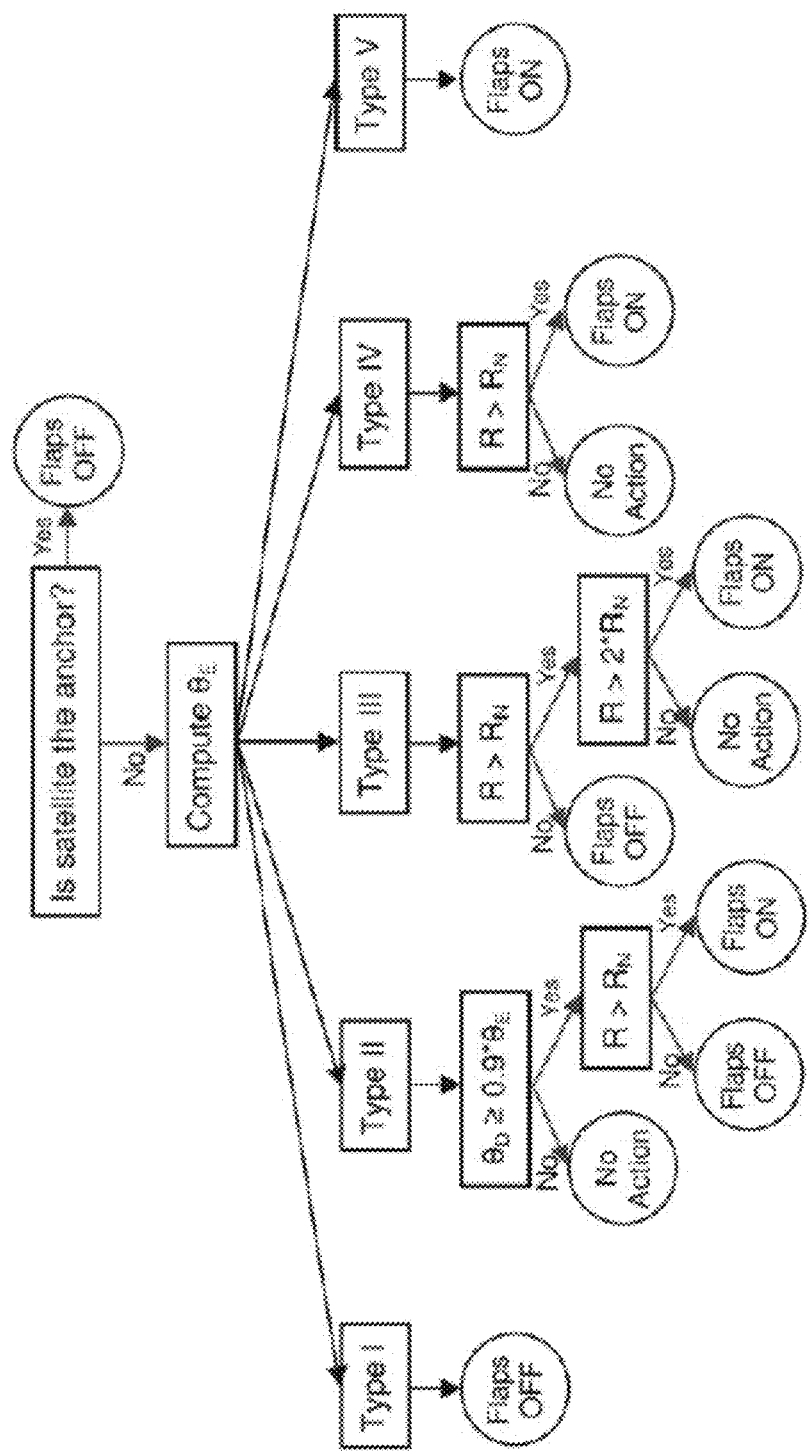
FIG. 6 is a flow diagram of the control law according to an embodiment of the instant invention for Formation Maintenance in Nominal Operations Mode.

FIG. 6 shows the formation maintenance control law according to an embodiment of the instant invention. In the flow diagram, $\theta_E$ represents the position error of the satellite with respect to the anchor. Type I indicates that position error is negative and the satellite is outside the boundary of the control box. In Type II, the position error is negative and inside the control box boundary. Type III represents position error that is positive and has a magnitude less than one-half of the control box size. Type IV indicates a position error that is positive and is greater than or equal to 50% of the control box size but less than 90% or the control box size. In Type V, the position error is positive and greater than 90% of the control box size. In general, flaps are stowed if the satellite becomes the anchor, if the satellite is classified as Type I, or if the satellite's position error less than 50% of the control box size and its separation rate with respect to the anchor is less than or equal to $R_N$. It should be noted that the Type definitions are suggestions and are optionally alterable to suit a particular application.

In the event of a satellite failure, the secondary formation maintenance mode is triggered. Consider the following example using a 6-satellite constellation. A single satellite failure in the 6-satellite global formation results in a 120 degree coverage gap that must be refilled in order to maximize coverage. The secondary formation maintenance mode uses a procedure similar to the one presented for formation establishment, except that all control is performed relative to the base satellite, defined as the satellite directly leading the coverage gap, i.e., the satellite with the lowest mean velocity.

Figure 7:
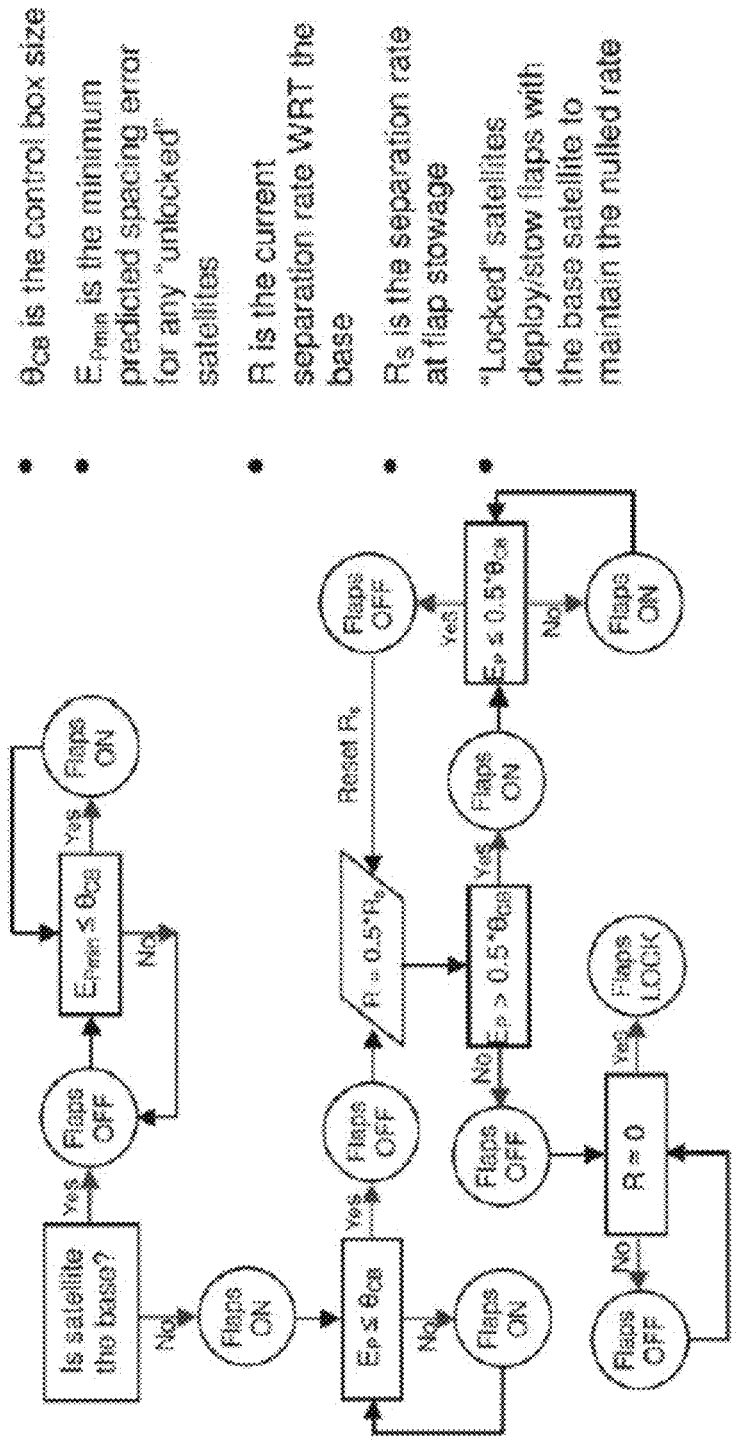
FIG. 7 is a flow diagram of the control law according to an embodiment of the instant invention for Formation Maintenance in Secondary Mode, Redistribution.

FIG. 7 shows the control law for the secondary formation maintenance mode, known as redistribution. Included are separate procedures for base (or anchor) and non-base (or non-anchor) satellites. After a satellite failure, all non-base satellites immediately deploy flaps so as to begin moving away from the base satellite. As they approach the desired spacing, their flaps are stowed and flaps on the base are deployed in order to begin nulling the separation rates. As with formation establishment, flaps on non-base satellites are optionally re-deployed to achieve additional drift, if necessary. Once a separation rate has been nulled, the satellite locks its flap configuration with that of the base in order to preserve the nulled rate. The formation transitions back to the nominal operations mode of formation maintenance when all non-base satellites are locked with the base satellite.

It should be understood by those skilled in the art that the redistribution control law is optionally used for any large-scale formation maneuvering, and not solely as a satellite failure contingency. For instance, the redistribution control law can additionally be used for formation establishment in the event that the satellites start with little or no relative in-track velocity. This would be the case if, for example, it were desired to separate a clustered formation into a global formation or if the satellites separate from the launch vehicle with minimal relative in-track velocity components.

Figure 8:
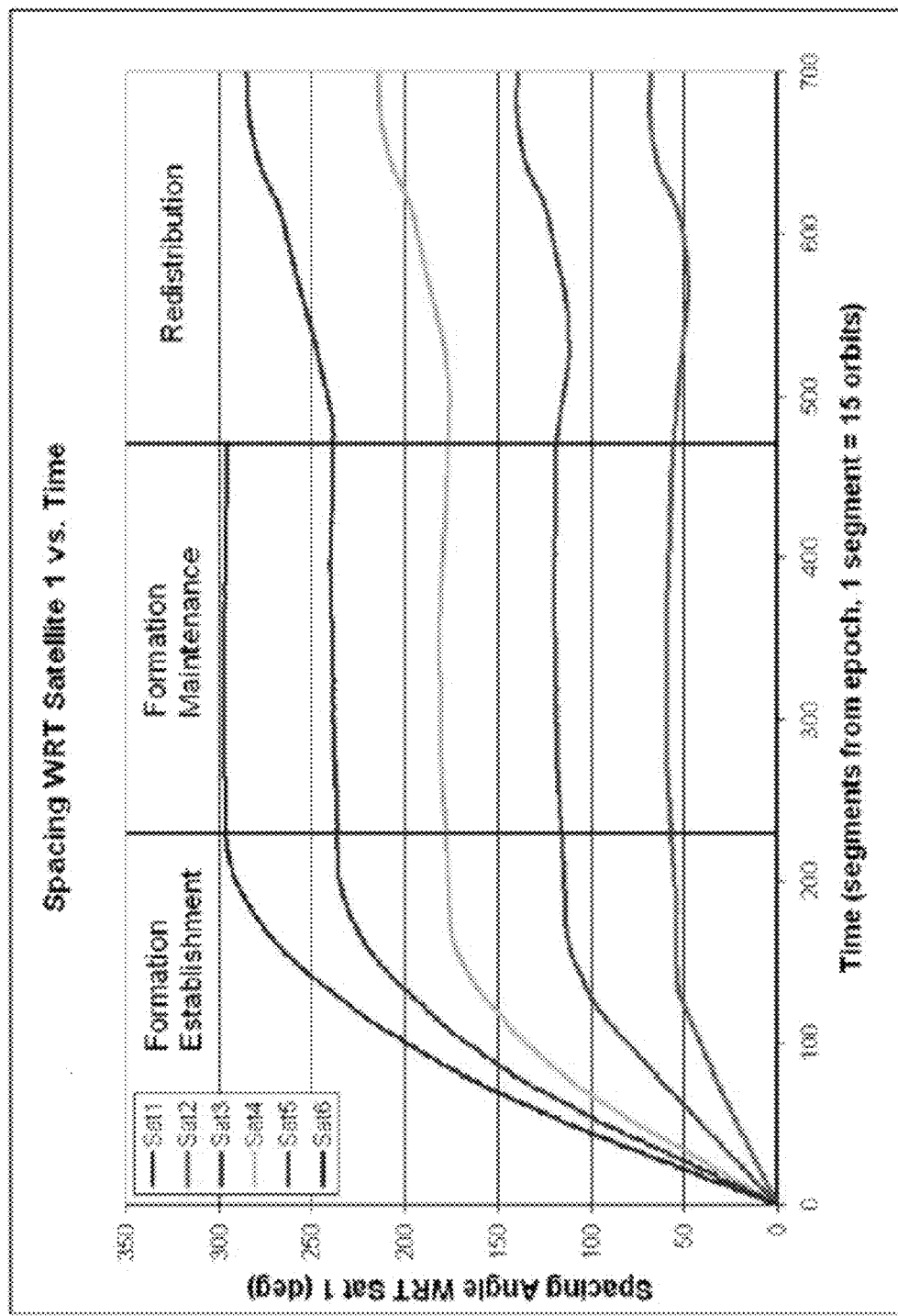
FIG. 8 is a flow diagram of the control law according to an embodiment of the instant invention for formation establishment, maintenance, and redistribution for an illustrative 6-satellite constellation.

FIG. 8 shows an illustrative continuation of the nominal formation establishment scenario, wherein Satellite 6 fails 473 days after launch. Between the establishment of the formation 234 days after launch and the failure of Satellite 6, the formation maintenance algorithm (nominal operations mode) keeps the satellites well within the designated control box tolerance of ±6 degrees. This is a relatively wide control box and could be narrowed, if necessary. In fact, while the maximum allowable error between any 2 satellites is 12 degrees based on the control box size, the maximum achieved error is less than 5 degrees during the formation maintenance portion of this scenario.

Alternative embodiments are discussed as follows. The control laws for formation establishment, formation maintenance and redistribution are made deliberately so that control parameters can be reset based on the particular mission. For example, the parameter $R_N$, the threshold for a nulled separation rate, should be reset based on the change in velocity $\Delta V$ that is achievable with the drag flaps over a specified time interval. When atmospheric density is lower due to solar minimum or increased altitude, $R_N$ should be decreased to reflect the limited capacity of the flaps. Similarly, the control box size will change based on mission criteria.

If necessary, the nominal operations mode of formation maintenance can utilize a single flap while the spacecraft is in sunlight in order to help mitigate the effects of self-shadowing on the satellite solar panels, which may be attached to the body of the spacecraft or may be appendages. While the spacecraft will generate only half the possible $\Delta V$ from drag acceleration, it is important to remember that, in the nominal mode of operations, the relative velocities between satellites are very small and could therefore be negated using a single flap. The same modification could be used during formation establishment and redistribution if the atmospheric density was large enough to ensure that the separation rates could be nulled using only one flap. Additionally, use of one flap requires that the attitude control system can maintain directional control to overcome the torque induced by the asymmetric center of pressure.

For the case of non-circular orbits, defining the desired separation angle between spacecraft optionally includes controlling the separation in mean anomaly, controlling the average spacing between vehicles over an orbit, and/or controlling the separation between vehicles at a particular point in the orbit. Additionally, the anchor is optionally defined not as the spacecraft with the highest instantaneous velocity, but instead as the spacecraft with the highest mean velocity over an orbit. This would eliminate the need to change anchors to reflect the spacecraft closest to periapse.

Although the example scenarios provided in this specification assume Earth as the primary body, these control laws can apply to any orbit provided that atmospheric density is large enough to induce sufficient differential drag.

An embodiment of the invention comprises a computer program that embodies the functions described herein and illustrated in the appended how diagrams. However, it should be apparent that there could be many different ways of implementing the invention in computer programming, and the invention should not be construed as limited to any one set of computer program instructions. Further, a skilled programmer would be able to write such a computer program to implement an exemplary embodiment based on the flow charts and associated description in the application text. Therefore, disclosure of a particular set of program code instructions is not considered necessary for an adequate understanding of how to make and use the invention. The inventive functionality of the claimed computer program will be explained in more detail in the following description read in conjunction with the figures illustrating the program flow.

One of ordinary skill in the art will recognize that the methods, systems, and control laws discussed above may be implemented in software as software modules or instructions, hardware, or in a combination of software and hardware. The methods, systems, and control laws described herein may be implemented on many different types of processing devices by program code comprising program instructions that are executable by one or more processors. The software program instructions may include source code, object code, machine code, or any other stored data that is operable to cause a processing system to perform methods described herein.

The methods, systems, and control laws may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit or code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

Systems and methods disclosed herein may use data signals conveyed using networks (e.g., local area network, wide area network, internet, etc.), fiber optic medium, carrier waves, wireless networks, etc. for communication with one or more data processing devices. The data signals can carry any or all of the data disclosed herein that is provided to or from a device.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed as new and desired to be protected by Letters Patent of the United States is:

1. A method of establishing a primary formation of a plurality of directionally fixed satellites, the plurality of satellites comprising an anchor satellite and at least one non-anchor satellite, each satellite of the plurality of satellites comprising at least one drag flap, each satellite of the plurality of satellites being free of one of a propulsion system and an expendable mass propellant, the method comprising:

determining a position and velocity of each satellite of the plurality of satellites after deployment thereof from a launch vehicle;

designating a satellite of the plurality of satellites having a highest mean velocity as the anchor satellite;

determining a current spacing and a current separation rate of each non-anchor satellite with respect to the anchor satellite based on the determined position and velocity of the each satellite;

predicting a final spacing of the plurality of satellites based on the current spacing and the current separation rate of the each non-anchor satellite, solar and lunar perturbing gravitational conditions, earth gravitational conditions, solar radiation pressure, and an atmospheric density model;

applying control using at least one processor to deploy the at least one drag flap of the at least one non-anchor satellite based on the current spacing and the current separation rate of the each non-anchor satellite, and the predicted final spacing of the plurality of satellites; and repeating the final spacing predicting and the drag flap control applying until the current separation rate has been nulled to within a threshold value, wherein said repeating the final spacing predicting and the drag flap control applying until the current separation rate has been nulled to within the threshold value is performed after the current separation rate has been reduced by a predetermined percentage relative to its value at a time of drag flap deployment.

2. The method according to claim 1, further comprising:
   stowing the at least one drag flap of the at least one non-anchor satellite when the current separation rate has been nulled to within the threshold value.

3. The method according to claim 1, further comprising:
   stowing the at least one drag flap of the at least one non-anchor satellite before the current separation rate has been nulled to within the threshold value.

4. A method of establishing a secondary formation of a plurality of directionally fixed satellites, the plurality of satellites comprising an anchor satellite and at least one non-anchor satellite, each satellite of the plurality of satellites comprising at least one drag flap, each satellite of the plurality of satellites being free of one of a propulsion system and an expendable mass propellant, the method comprising:

determining a position and velocity of each satellite of the plurality of satellites after deployment thereof from a launch vehicle;

designating a satellite of the plurality of satellites having a lowest mean velocity as the anchor satellite;

applying first control using at least one processor to deploy the at least one drag flap of the at least one non-anchor satellite to induce an induced velocity for each non-anchor satellite with respect to the anchor satellite;

determining a current spacing and a current separation rate of each non-anchor satellite with respect to the anchor satellite based on the determined position and induced velocity of the each satellite;

predicting a final spacing of the plurality of satellites based on the current spacing and the current separation rate of the each non-anchor satellite, solar and lunar perturbing gravitational conditions, earth gravitational conditions, solar radiation pressure, and an atmospheric density model;

applying second control using the at least one processor to stow the at least one drag flap of the at least one non-anchor satellite and to deploy the at least one drag flap of the anchor satellite based on the current spacing and the current separation rate of the each non-anchor satellite, and the predicted final spacing of the plurality of satellites; and repeating the final spacing predicting and the second drag flap control applying until the current separation rate has been nulled to within a threshold value, wherein said repeating the final spacing predicting and the drag flap control applying until the current separation rate has been nulled to within the threshold value is performed after the current separation rate has been reduced by a predetermined percentage relative to its value at a time of drag flap deployment.

5. The method according to claim 4, further comprising:
   matching a configuration of the at least one drag flap of the at least one non-anchor satellite to a configuration of the at least one drag flap of the anchor satellite when the current separation rate has been nulled to within the threshold value.

\* \* \* \* \*